United States Patent [19]

Kowalski

[11] 4,124,155
[45] Nov. 7, 1978

[54] LUGGAGE RACK

[75] Inventor: Gerald L. Kowalski, Royal Oak, Mich.

[73] Assignee: Four Star Corporation, Troy, Mich.

[21] Appl. No.: 823,670

[22] Filed: Aug. 11, 1977

[51] Int. Cl.² .............................................. B60R 9/04
[52] U.S. Cl. ............................... 224/42.1 D; 52/716; 403/246; 224/42.1 E
[58] Field of Search ...................... 224/42.1 D, 42.1 E, 224/42.1 R, 29 R, 42.45 R; 9/1.1, 1.7; 52/242, 716, 717, 718, 280, 461, 465, 467, 463; 403/246, 263; 24/73

[56] References Cited

U.S. PATENT DOCUMENTS

| | | | |
|---|---|---|---|
| 3,120,914 | 2/1964 | Smith | 224/42.1 E |
| 3,171,578 | 3/1965 | Genthe | 224/42.1 E |
| 3,451,602 | 6/1969 | Bott | 224/42.1 E |
| 3,951,320 | 4/1976 | Bott | 224/42.1 D |

Primary Examiner—Trygve M. Blix
Assistant Examiner—Jerold M. Forsberg
Attorney, Agent, or Firm—Basile and Weintraub

[57] ABSTRACT

A luggage rack bed includes a slat having a downwardly depending tab formed at end thereof. The tab seats in a groove formed in a fixed strap to define a preferred mode of interengaging the slat and strap. A strap cover has a notch formed therein which registers with the tab to lock the tab in the groove. The cover is snap fitted to the strap. With the ends of the strap fixed to luggage rack support stanchions to maintain the flexure of the strap the momentary forces, caused by a load being applied to the bed, are distributed throughout the bed.

11 Claims, 4 Drawing Figures

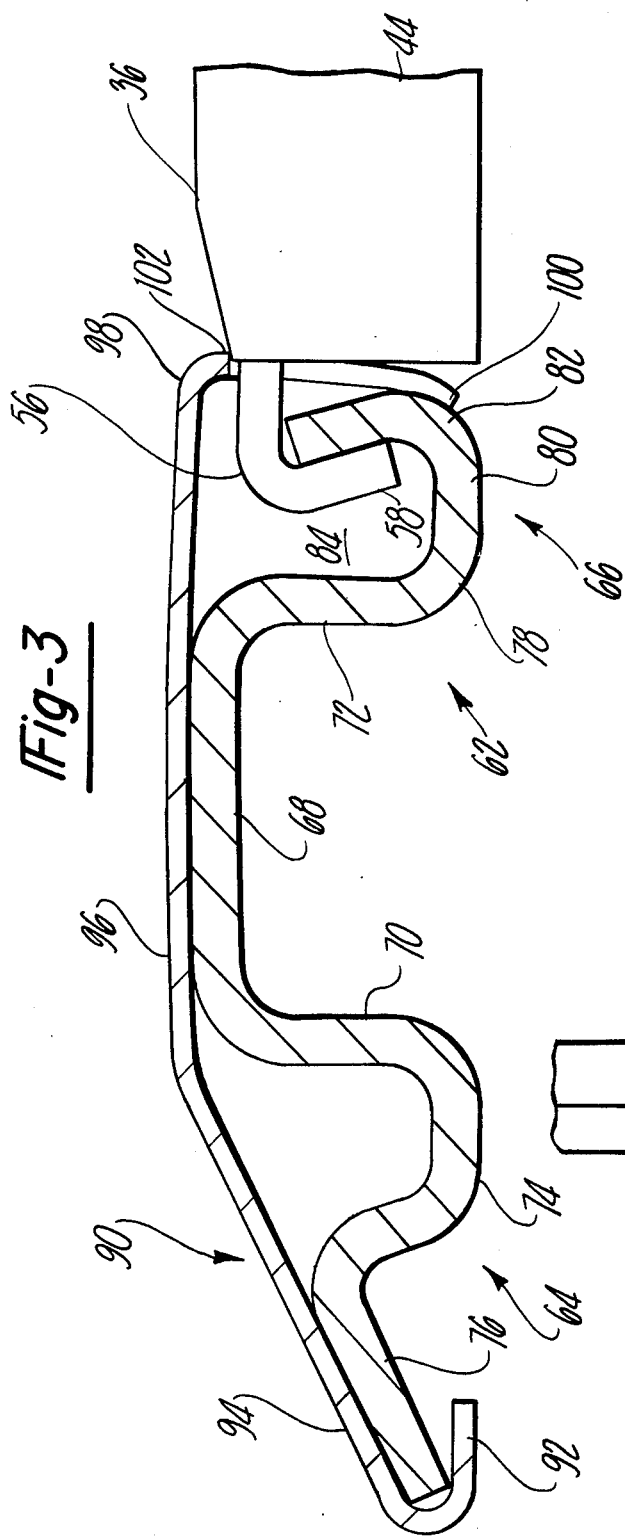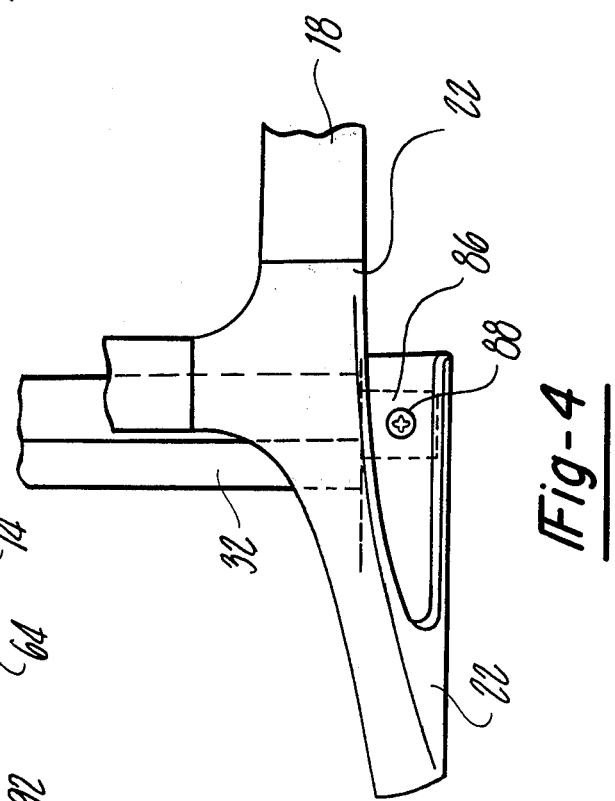

LUGGAGE RACK

BACKGROUND OF THE INVENTION

1. Field of the Invention

The present invention pertains to luggage racks. More particularly, the present invention pertains to luggage rack beds. Even more particularly, the present invention pertains to load distributing luggage rack beds.

2. Prior Art

There has been developed heretofore a wealth of technology attendant vehicle-mounted luggage racks. As is known to the skilled artisan, the luggage racks facilitate the transporting of a load by enabling it to be placed, optimally, on the vehicle roof. Vehicle roof loading avoids visual obstructions and the like. However, one of the more important problems encountered with roof loading is weight distribution. If the forces created by a load are too great, then, conceivably the slats and straps comprising the bed of the rack could be collapsed and the roof of the vehicle dented.

The support stanchions for the side rails of the luggage racks are structurally strong members. Thus, if the momentary forces created by a load applied to the bed could be distributed throughout the bed with the configuration of the bed being retained by the stanchions, then the load capacity of the racks could be increased. It will be appreciated from the ensuing description that the present invention achieves this purpose.

STATEMENT OF RELEVANT ART

Applicant believes the following to be the most relevant prior art:

U.S. Pat. Nos.
3,724,730; 2,475,903; 3,951,320; 2,630,995; 3,623,642; 3,223,301; 3,171,578; 2,663,472; 3,451,602; 2,781,227; 2,387,779.

The art fails to achieve the load distribution as contemplated by the present invention.

SUMMARY OF THE INVENTION

In accordance with the present invention, there is provided a luggage rack bed incorporating means for distributing the weight of an applied load. In a preferred embodiment, the luggage rack bed hereof comprises:

(a) a slat,
(b) a downwardly depending tab disposed at one end of the slat, and
(c) a flexed or bowed strap disposed substantially perpendicular to the slat, the strap having a groove formed therein, the tab seating in the groove to interconnect the seat to the strap.

The ends of the strap are fixedly mounted to support stanchions. The stanchions are spaced apart and, usually, parallel. The stanchions maintain the strap in a flexed state to ensure the load bearing capacity thereof.

A cover is snap fitted onto the strap. The cover has a notch formed therein which envelopes the tab to lock it in position. Thus, the cover defines means for locking the tab in position.

The slat and strap, each, have load bearing configurations for enhancing the structural integrity thereof.

The present invention broadly contemplates achieving interconnection between the slat and strap for load bearing distribution. Thus, means other than the tab, such as mere abutment or overlapping, can be utilized in the practice hereof.

Furthermore, and in accordance with the present invention, there is provided a luggage rack having the load bearing thereof distributed throughout the bed. The stanchions maintain the strap of the bed in a flexed state when a load is applied to the bed.

For a more complete understanding of the present invention, reference is made to the following detailed description and accompanying drawing. In the drawing, like reference characters refer to like parts throughout the several views in which:

BRIEF DESCRIPTION OF THE DRAWING

FIG. 3 is a sectional view partly in cross-section of an interconnected slat and strap associated hereof, and FIG. 4 is a broken top plan view of a stanchion having a strap connected thereto.

DESCRIPTION OF THE PREFERRED EMBODIMENT

Figure 1:
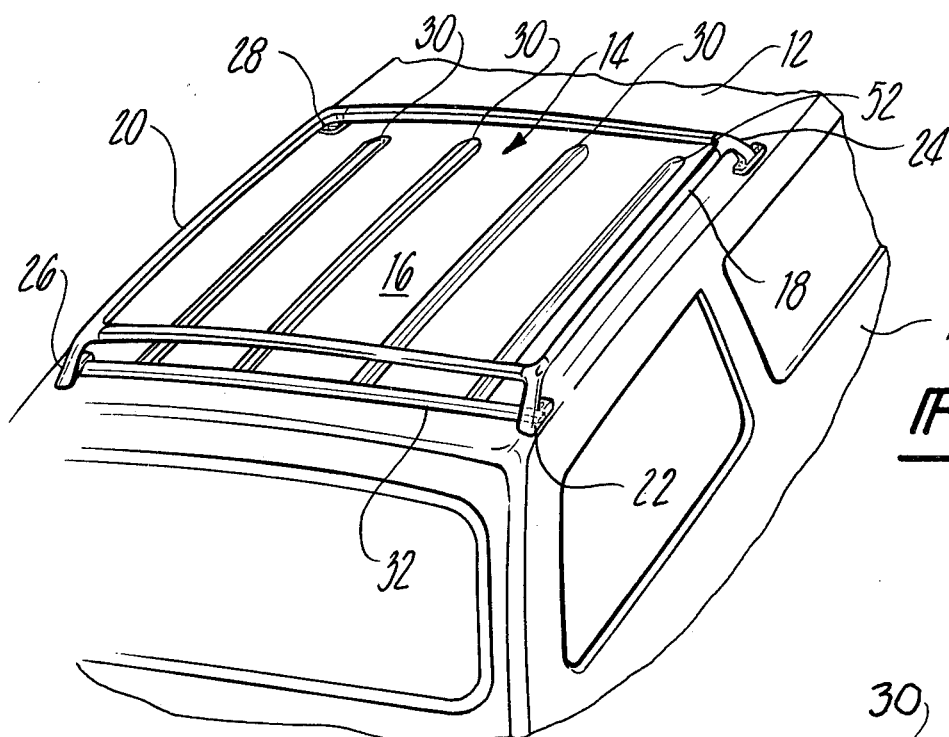
FIG. 1 is a broken perspective view of a vehicle incorporating the present invention.

Now, and with reference to the drawing, there is depicted therein a load distribution luggage rack in accordance with the present invention. As is known to the skilled artisan, the luggage racks of the type under consideration herein are, ordinarily, disposed atop and affixed to the roof of a vehicle. Thus, for purposes of facilitating an understanding hereof, such a conventional environment will be referenced herein.

In accordance with the present invention, a vehicle 10 has a roof structure 12 in the well known manner. Affixed to the roof structure 12 is a luggage rack embodying the principles of the present invention, and, generally, denoted at 14. The luggage rack 14 comprises a bed 16, a pair of spaced apart, ordinarily parallel, longitudinally extending side rails 18, 20 and a pair of side rail support stanchions 22, 24, 26 and 28. The stanchions are fixed to the roof structure 12 and support the associated side rails. In accordance with the present invention, and as will subsequently be detailed, the bed 16 has a portion thereof fixed to a pair of opposite stanchions 22, 26, as illustrated.

The bed 16 of the luggage rack 14 comprises at least one longitudinally extending slat 30. The bed, also, comprises at least one strap or cross strap 32. The cross strap 32 is disposed substantially perpendicular to the slat 30. Means, generally, denoted at 34 interconnects the slat to the strap.

With more particularity, the slat 30 is a longitudinally extending unitary symmetrical member. The slat is configured for optimum load bearing capacity. The slat comprises a top wall 36 having a central longitudinally extending recess 38. Radiating laterally outwardly from the recess are sloped opposed shoulders 40, 42 respectively. Depending downwardly from the outer end of each shoulder is a leg 44, 46, respectively. Each leg is substantially perpendicular to the top wall 36. The free end of each leg 44 or 46 terminals in an inwardly directed flange 48, 50, respectively. The flanges 48, 50 are opposed and inwardly directed. An aperture 52 is formed in the top wall 36 of the slat 30 proximate one end thereof. The aperture 52 receives a fastener, such as a threaded screw therethrough for securing the slat to the roof structure 12.

Figure 2:
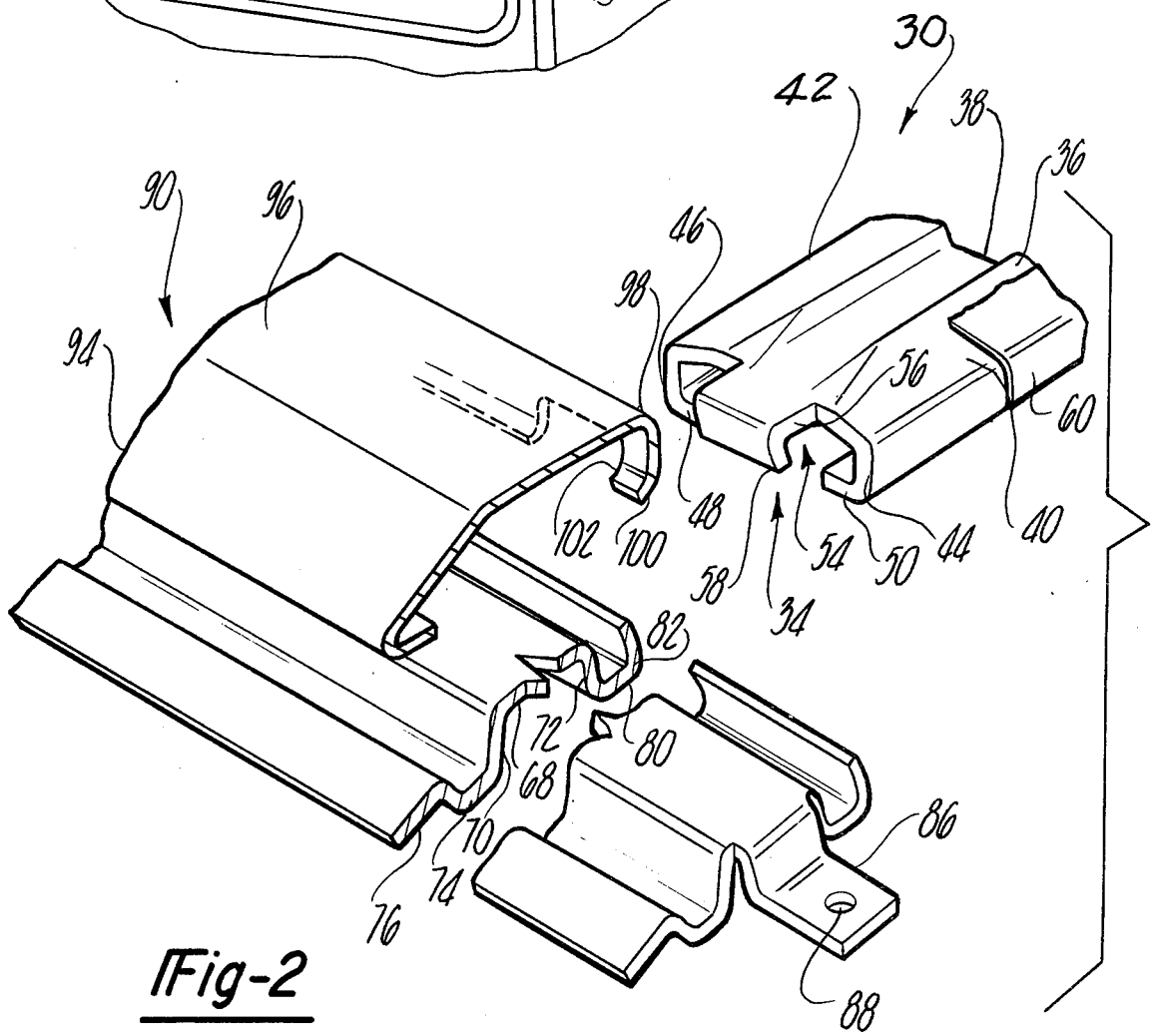
FIG. 2 is an exploded broken perspective view of the luggage rack bed associated hereof.

It will be seen in FIG. 2, that the slat 30 is configured such that it is only the flanges 48, 50 which engage the roof structure and rest thereon. A load applied across the top wall 36 is distributed along the length thereof, as well as to the flanges and the roof structure 12.

It is to be understood, however, that in accordance with general principles known to the skilled artisan an insulative padding (not shown) is interposed between the roof 12 and the metallic components of the rack which would otherwise be in contact therewith. This avoids galvanic action or electrolysis between the roof and the metallic part of the rack.

The end of the slat 30 opposite that of the end provided with the fastener receiving aperture carries the means 34 for interconnecting the slat 30 to the strap 32.

The means 34, generally, comprises a downwardly directed lip or tab 54. The lip 54 comprises a first arm 56 which extends longitudinally outwardly from the top wall 36. Preferably, the arm 56 extends outwardly from the base of the recess 38 and has a width substantially equal to that of the recess 38. A second arm 58 depends downwardly from the first arm 56 at an angle thereto. Preferably, the arm 58 is at an acute angle to the first arm 56. The second arm is formed integrally with the first arm at the outer or free end thereof. The arm 58 has a width equal to that of the arm 56. In fabricating the means 34, it is, preferably, formed integrally with the slat 30.

In order to enhance the aesthetic appearance of the slat, a cover 60 is provided. The cover 60 is configured analogously to the slat 30 and is coextensive therewith. The cover 60 completely envelops the slat 30, save for the means 34, the aperture 52 and slight portions of the flanges 48, 50 which contact the roof structure 12. By the conjoint use of the slat 30 and cover 60, there is provided the necessary structural rigidity for efficacious deployment of the slat.

As heretofore noted, the cross strap or strap 32 receives the means 34 to effectuate interengagement between the slat and the strap.

The strap 32, as shown in FIG. 3, comprises a central U-shaped section 62 with lateral channel or groove-forming sections 64, 66 integrally formed therewith. The U-shaped section 62 comprises a bight or interconnecting wall 68 and a pair of opposite, downwardly depending legs 70, 72 formed therewith. Formed laterally outwardly from the central section on one side thereof is a first groove forming section 64. The section 64 is integral with the central section 62 and comprises a sinusoidal leg 74. The leg 74 is unitarily formed with the leg 70, as shown. A retainer leg 76 projects laterally outwardly from the leg 74. As shown in FIG. 3, the leg 76 does not terminate coplanar with the bottom of leg 74, but rather is vertically spaced thereabove. This enables a cover to be tucked into the clearance in a manner to be described subsequently.

The opposite side of the central section has the channel or groove-forming section 66 integral therewith. The second 66 comprises a J-shaped member having a first leg 78 integral with leg 72. An arcuate section 80 interconnects leg 78 with an upstanding leg 82. The leg 82 extends upwardly from the arcuate section 80 and at an angle inclined with respect to the horizontal plane, ranging from about 45° to about 90°, as shown. The space 84 between the legs 78 and 82 defines a channel for receiving the means 34.

In accordance herewith, the bottom surface of the leg 74 as well as that of the arcuate section 80 seats upon the roof structure 12 and are coplanar. Furthermore, and in accordance herewith, interconnection or interengagement between the slat and strap is effectuated by inserting the arm 58 of the tab 54 into the channel or space 84.

Each end of the strap is secured to an associated stanchion or casting 22 or 26, as heretofore noted. To effectuate securement, each end of the strap includes a substantially flat plate member 86 integrally formed with an longitudinally projecting outwardly from the bight 68. An aperture 88 formed in the plate receives a threaded fastener or the like therethrough. The aperture is in registry with an aperture (not shown) formed in the associated stanchion. The threaded fastener, thus, rigidly connects or fixes the associated end of the strap to the associated stanchion. The stanchions, per se, are of conventional construction and support the side rails, as heretofore noted.

In mounting the strap 32 between the stanchions, it is bowed or flexed with an upwardly extending arc. As hereinbefore noted, by virtue of the rigid connection between the strap ends and the stanchions, the flexure is maintained even when a load is applied to the bed.

Referring, again, to the drawing and in particular FIGS. 2 and 4, there is illustrated a cover 90 for the strap 32. The cover 90 is snap fitted to the strap 32. The cover 90 promotes structural integrity for the strap while being aesthetically pleasing. As shown in the drawing, the cover 90 has an irregular configuration. The cover 90 includes a flange 92 which tucks beneath the projecting leg 76. A sloped wall 94 extends upwardly and radially inwardly from the flange and terminates at a substantially flat, planar wall 96 which overlies the central U-shaped section 62 and tab receiving channel sections 66. A leg 98 depends downwardly from the free end of the wall 96 and terminates at an arcuate end 100. The leg 98 engages and is snap fitted to the channel section 66.

The leg 98 is provided with a notch or cut-out section 102. The notch 102 circumscribes the leg 56 of the means 34. Thus, when the cover 90 is snap fitted into position, the notch 102 engages the arm 56 and, thus, locks it in position. It is to be, thusly, seen that the cover 90, also, defines means for locking the interconnecting means 34 in position.

In practicing the present invention, the slat is interconnected to the strap which, in turn, is fixed to the stanchions. The strap cover is then positioned and the tab, thereby, is locked via the notch. Because of this assembly, when a load is placed on the bed 16, to the cross-strap, the stanchions via the fixed interconnection with the strap, maintains the flexure in the strap, thereby creating a "truss" effect in the strap. Because of the truss effect, the load bearing capacity of the bed is greatly increased, since the strap now has a load bearing capacity which is greater than that of the structure itself.

Also, in practicing the present invention, it is contemplated that a plurality of slats 32 be employed. The slats are parallel and coextensive and analogously configured. Thus, with plural slats, the cover 90 is provided with plural notches for locking the means 34 in position.

It should be noted that in utilizing the threaded fasteners or other fastening means to secure the skids to the roof structure that a three-point cantilevering effect is created for the entirety with a three-point effect characterizing each skid. Furthermore, in assembling the present invention, it is highly desirable that the free or apertured end of the skids be attached, via the fasteners, to the roof frame unitized structure of the rear door/window frame. This is because this frame structure is extremely strong in and of itself.

It is to be further noted with respect hereto that other means of achieving interengagement between the slat and strap can be utilized herein. For example, abutment between the slat and strap will cause load distribution. Also, by overlapping the strap over the slat or underlying the slat under the strap can be efficacious. Also, means other than the tab, such as a projecting pin into the strap from the slat can be efficaciously deployed. Such modes of practicing the invention are within the scope hereof.

Furthermore, it is to be understood that configuration of the slat and strap other than those described herein are within the ambit and purview of the present invention.

Also, it is possible to replace the aperture 52 and threaded fastener therefor with a second cross-strap. All such modifications are within the scope of the present invention.

In assembling the present invention, the cross-strap is manufactured with the flex arc. This enables the "truss" effect hereinabove described.

It is to be appreciated from the preceding that the present invention provides a load distributing luggage rack bed assembly as well as a luggage rack which distributes the load applied directly to the cross-strap which remains flexed by the support stanchions.

Having, thus, described the invention what is claimed is:

1. A luggage rack bed, comprising:
   (a) a slat,
   (b) a flexed elongated strap having first and second opposed ends disposed substantially perpendicular to the slat,
   (c) means for interconnecting the slat to the strap to enable a load applied to the bed to be distributed throughout the bed, the means for interconnecting comprising:
   a tab disposed at one longitudinal end of the slat, the tab comprising:
     (1) a first arm projecting outwardly from the end of the slat, and
     (2) a second arm downwardly depending from the first arm, the second arm being interengageable with the strap,
   (d) means for rigidly connecting the strap to a support stanchion, the means being formed at each end of the strap such that each end of the strap is connectable to an associated stanchion, the connecting means maintaining the strap in a flexed state upon the application of a load to the bed, and
   (e) a cover snap fitted to the strap locking the tab in the channel and preventing lateral movement thereof.

2. The luggage rack bed of claim 1 wherein the strap comprises:
   a channel formed along one lateral side thereof, the channel defining a slot for receiving the second arm therewithin to interconnect the slat to the strap.

3. The luggage rack bed of claim 1 wherein
   the cover has a notch formed therein which circumscribes the tab, the notch rendering the tab immovable upon the cover being snap fitted thereunto, the notch defining the means for locking.

4. The luggage rack bed of claim 1 which further comprises:
   means for locking the tab in position upon the interengagement of the second arm and the strap.

5. The luggage rack bed of claim 1 which further comprises:
   a plurality of parallel, spaced apart coextensive slats, each slat being interconnectable to the same strap, each slat comprising the means for interconnecting the slat to the strap.

6. The luggage rack bed of claim 1 wherein each connecting means comprises:
   (a) a plate integrally formed with the strap at an associated end, the plate having an aperture formed therethrough and in registry with an aperture formed in the stanchion, and
   (b) a fastener extending through the fasteners to tie the strap to the stanchion.

7. In a luggage rack of the type having a luggage bed comprising at least one slat and one strap, a pair of side rails and a stanchion at each corner of the rack, an improved bed therefor comprising:
   the luggage bed of claim 6, and wherein a load applied to the bed is distributed throughout the bed, the stanchion's maintaining the strap in a flexed state.

8. The improvement of claim 7 wherein the strap comprises:
   a channel formed along one lateral side thereof, the channel defining a slot for receiving the second arm therewithin to interconnect the slat to the strap.

9. The improvement of claim 8 which further comprises:
   wherein the cover has a notch formed therein which circumscribes the tab, the notch rendering the tab immovable upon the cover being snap fitted, the notch defining the means for locking.

10. The improvement of claim 7 which further comprises:
    a plurality of parallel, spaced apart coextensive slats, each slat being interconnectable to the same strap, each slat comprising the means for interconnecting the slat to the strap.

11. In a luggage rack of the type having the luggage bed of claim 1 comprising at least one slat and one strap, a pair of side rails and a support stanchion at each corner of the rack.

* * * * *